United States Patent [19]

Hisazumi et al.

[11] Patent Number: 4,892,765
[45] Date of Patent: Jan. 9, 1990

[54] HEAT-SHRINKABLE LAMINATE FILM AND PROCESS TO PRODUCE THE SAME

[75] Inventors: Nobuyuki Hisazumi, Tsuchiura; Keisuke Kahara; Yoshihiro Matsukura, both of Iwaki, all of Japan

[73] Assignee: Kureha Kagaku Kogyo Kabushiki Kaisha, Tokyo, Japan

[21] Appl. No.: 53,404

[22] Filed: May 22, 1987

[30] Foreign Application Priority Data

May 23, 1986 [JP] Japan .................. 61-118724

[51] Int. Cl.$^4$ .................................. A22C 13/00
[52] U.S. Cl. .................. 428/34.8; 428/34.9; 428/214; 428/215; 428/423.5; 428/424.6; 428/475.8; 428/476.3; 428/520; 428/522
[58] Field of Search ........... 428/476.3, 475.8, 520, 428/522, 34.9, 34.8, 423.5, 424.6, 214, 215

[56] References Cited

U.S. PATENT DOCUMENTS

| | | | |
|---|---|---|---|
| 3,355,319 | 11/1967 | Rees | 428/349 |
| 3,524,795 | 8/1970 | Peterson | 264/171 |
| 3,595,740 | 7/1971 | Gerou | 428/349 |
| 3,622,439 | 11/1971 | Mann et al. | 428/475.8 |
| 3,645,822 | 2/1972 | Widiger et al. | 156/244.11 |
| 3,707,590 | 12/1972 | Wiggins et al. | 264/173 |
| 3,887,755 | 6/1975 | Zamer | 428/35 |
| 3,900,616 | 8/1975 | Moore | 428/518 |
| 3,903,351 | 9/1975 | Ando et al. | |
| 3,908,070 | 9/1975 | Mayzolf | 428/518 |
| 3,932,692 | 1/1976 | Hirata et al. | 428/520 |
| 3,953,557 | 4/1976 | Bray | 264/173 |
| 4,008,352 | 2/1977 | Dawes et al. | 428/518 |
| 4,082,877 | 4/1978 | Shadle | 428/35 |
| 4,133,924 | 1/1979 | Seino et al. | 428/181 |
| 4,134,952 | 1/1979 | Yoshikawa et al. | 425/133.1 |
| 4,161,562 | 7/1979 | Yoshikawa et al. | 428/215 |
| 4,188,443 | 2/1980 | Mueller | 428/483 |
| 4,226,822 | 10/1980 | Yoshikawa et al. | 264/173 |
| 4,261,473 | 4/1981 | Yamada et al. | 215/1.003 |
| 4,284,672 | 8/1981 | Stillman | 428/35 |
| 4,284,674 | 8/1981 | Sheptak | 428/69 |
| 4,289,830 | 9/1981 | Knott et al. | 428/475.8 |
| 4,296,156 | 10/1981 | Lustig et al. | 428/35 |
| 4,309,466 | 1/1982 | Stillman | 428/35 |
| 4,310,578 | 1/1982 | Katsura | 428/516 |
| 4,379,117 | 4/1983 | Baird, Jr. et al. | 264/514 |
| 4,390,587 | 6/1983 | Yoshimura | 428/215 |
| 4,438,180 | 3/1984 | Lang et al. | 428/475.8 |
| 4,442,158 | 4/1984 | Distler | 428/516 |
| 4,448,792 | 5/1984 | Schriner | 426/113 |
| 4,450,028 | 5/1984 | Vilutis | 156/198 |
| 4,457,960 | 7/1984 | Newsome | 428/35 |
| 4,525,414 | 6/1985 | Ohya et al. | 428/476.3 |
| 4,578,294 | 3/1986 | Ouchi et al. | 428/476.3 |
| 4,733,795 | 3/1988 | Ohya et al. | 428/476.3 |
| 4,856,448 | 12/1974 | Iijima et al. | 425/133.1 |

FOREIGN PATENT DOCUMENTS

| | | |
|---|---|---|
| 982923 | 2/1976 | Canada . |
| 0003635 | 2/1971 | European Pat. Off. . |
| 0051480 | 5/1982 | European Pat. Off. . |
| 0107854 | 5/1984 | European Pat. Off. . |
| 1372805 | 2/1976 | France . |
| 2516067 | 5/1983 | France . |
| 51-76366 | 1/1976 | Japan . |
| 52-32911 | 8/1977 | Japan . |
| 51-11907 | 5/1979 | Japan . |
| 55-73339 | 5/1980 | Japan . |
| 5810828 | 10/1980 | Japan . |
| 5193976 | 2/1981 | Japan . |
| 1422358 | 1/1976 | United Kingdom . |
| 1486849 | 9/1977 | United Kingdom . |
| 1480204 | 2/1980 | United Kingdom . |
| 1591424 | 6/1981 | United Kingdom . |
| 2129370 | 5/1984 | United Kingdom . |
| 2040804 | 1/1985 | United Kingdom . |
| 2142277 | 1/1985 | United Kingdom . |

Primary Examiner—Edith Buffalow
Attorney, Agent, or Firm—John P. White

[57] ABSTRACT

The present invention discloses a heat-shrinkable laminate film which comprises a core layer of a copolymer of vinylidene chloride, two surface layers of a polyamide and an adhesive layer between core and surface layers and is excellent in a barrier property to gaseous oxygen, a barrier property of water vapor, an anti-creep property at a high temperature, an anti-pinhole property, a closely adhering property to meat, safety, an anti-curl property, an anti-creep property in warm water, an anti-delayed recovery property and an anti-peeling off property.

8 Claims, 1 Drawing Sheet

HEAT-SHRINKABLE LAMINATE FILM AND PROCESS TO PRODUCE THE SAME

BACKGROUND OF THE INVENTION

The present invention relates to a heat-shrinkable laminate film comprising a core layer of a copolymer of vinylidene chloride, two surface layers of polyamide(s) and layers of an adhesive between each of the two surface layers and the core layer and a process for producing the heat-shrinkable laminate film.

The adhesive is selected from the group consisting of a modified copolymer obtained by grafting a copolymer of ethylene and a vinyl carboxylate or an acrylic ester with an ethylenically unsaturated carboxylic acid or an acid anhydride thereof and a polymeric material obtained by neutralizing said modified copolymer with a metallic compound or a thermoplastic polyurethane.

The heat-shrinkable laminate film shows rates of shrinkage not less than 10% both lengthwise and breadthwise after keeping the film 3 seconds in an atmosphere of 90° C, rates of delayed recovery of not more than 2% lengthwise and breadthwise at room temperature and the rate of creep of not more than 20% after immersing the film 10 seconds in a warm water of 80° C with a load of 1 kg/mm$^2$.

So far, meat products such as hams and sausages are filled and/or packaged in a thermoplastic casing and subjected to heat treatment for a few minutes to a few hours at a temperature in the range of about 70 to 95° C and offered to markets.

The important points which should be satisfied by the packaging material used for packaging such meat products are as follows:

(1) The casing must have a sufficient impermeable property against gaseous oxygen in order to prevent the content to be spoiled during the period of distribution.

(2) The jelly of meat juice, etc. should not deposit between the casing and the content, and particularly, when the content is a meat product such as ham, sausage, etc., it is required that the casing firmly adhere to the content.

(3) Since the wrinkled or pleated appearance of a packaged foods gives an impression that such a food is a stale product, it is not desirable that the casing becomes wrinkled.

(4) The casing should not be broken nor deformed from a cylindrical form by a pressure at the time of filing (generally 0.2 to 0.5 kg/cm$^2$ G) and a pressure due to an expansion of the content at the time of heat-treatment. Namely, to the casing, an anti-creeping property at a high temperature is required. For instance, it is required that the casing is not deformed by the stress of at least 0.2 to 0.3 kg/mm$^2$ at the time of heat-treatment at a temperature of 70 to 95° C.

(5) It is desirable that the casing has a sufficient flexibility not to have any pinhole at a time of filling.

In order to respond the above requirements, although an unstretched monolayer casing comprising a homopolyamide (Nylons 11 and 12) and a coextruded two layer casing having a inner layer of the homopolyamide and an outer layer of Nylon 6 have already been publicly known, these casings are apt to be deformed by a filling pressure and since they are unstretched films, he wrinkles generate remarkably at the time of cooling after heat-treatment.

On the other hand, a heat-shrinkable casing comprising a polyamide or a mixture of the polyamide and a polyolefin has been proposed in Japanese Patent Application Laid-Open (KOKAI) No. 55-74744/1980 and it is shown therein that a deformation of the casing and a generation of wrinkles on the casing has been prevented. Furthermore, the casing comprising a thermoplastic polyester (for instance, polyethylene terephthalate) has also been known. However, since the above casings do not have the sufficient impermeability to gaseous oxygen and water vapor, they have common defect that the period of storage for the food products is unavoidably shortened. Besides, there is a disadvantage that the polyester casing does not firmly and closely adhere to the content such as ham, sausage, etc.

While, the casing comprising a copolymer of vinylidene chloride having a barrier property to gaseous oxygen and water vapor has already been widely used in the market, however, not only the extent of the close adherence of these casings to ham and sausage is insufficient but also the cylindrical forms of these casings are deformed sometimes by their dead weights at the time of heat-treatment when a size of the casings is large, and insufficiencies of their anti-creep property at a high temperature are also pointed out. Furthermore, pinholes are apt to be formed on the casings at the time of filling, and accordingly, improvements of such properties have been required.

In order to solve these defects, a heat-shrinkable laminate film comprising a copolymer of vinylidene chloride and a polyolefin and/or a polyamide has been proposed in Japanese Patent Applications Laid-Open (KOKAI) Nos. 59-79753/1984 and 59-174350/1984 and U.S. Pat No. 4,112,181.

However, the films disclosed in Japanese Patent Applications Laid-Open (KOKAI) Nos. 59-79753/1984 and 59-174350/1984 are apt to be curled and easily generate undesirable deformations such as delayed recovery and creeps in warm water, accordingly, it cannot be said that the films have a sufficient dimensional stability. Besides, in the laminate films disclosed in U.S. Patent No. 4,112,181, adhesions between layers are weak and accordingly, the laminate film has a defect of peeling off between the layers. In order to avoid the defects, layers of an adhesive are used for firmly adhering a copolymer of the core layer to a polyamide of the both surface layer. As the adhesive, a mixture of a copolymer of ethylene and vinyl acetate and a copolymer of ethylene and acrylic acid (refer to Japanese Patent Application Laid-Open (KOKAI) No. 49-41476/1974) and a mixture of a copolymer of ethylene and vinyl acetate and a copolymer of ethylene and ethyl acrylate (refer to Japanese Patent Application Laid-Open (KOKAI) No. 51-119075/1976) have been known.

However, the process for producing a heat-shrinkable film by biaxially stretching a coextruded laminate film, as in the present invention, necessitate an excellent adhesion between the layers against a peeling-off power at the time of stretching and it is desirable that the adhesive layers are heat-resistant in a range of heat treatment temperature (usually from a few minutes to a few hours at 70 to 95° C) to prevent peeling off at the treatment.

By the conventional adhesive, a sufficiently satisfiable result has not been obtained in the production of the heat-shrinkable laminate film which is the object of the present invention. Besides, in a case of conventional stretching of a single film, a laminate film or a sheet comprising a polyamide, an extremely high technique has been necessary, because the polyamide has hydrogen bonds.

Generally, to make a biaxially stretched single or laminate polyamide film, the film extruded from a T-die in a plate-form is biaxially stretched by a tenter-system. However, in order to produce a film for filling and/or packaging hams and sausages, it is desirable to extrude the film in a tubular form. Although the film which has been extruded in a tubular form is stretched generally by an inflation system, since a large stretching force is necessary when a polyamide film is used, the polyamide film obtained by an inflation system is easy to be non-uniform in thickness and it has been difficult to industrially and effectively manufacture a film of a uniform thickness. Furthermore, it has been pointed out that the adhesion between the layers becomes weak when the laminate film is stretched.

Taking into consideration the above situation, the present inventors have studied to provide heat-shrinkable laminate films which overcome the defects of conventional one and is suitable to package foodstuffs and have found that by coextruding a copolymer of vinylidene chloride as a core layer, a polyamide resin as two surface layers and an adhesive as adhesive layers between each of other layers, and by biaxially stretching the coextruded film under certain conditions, the heat-shrinkable laminate film excellent in a barrier property to gaseous oxygen, a barrier property to water vapor, an anti-creep property at a high temperature, an anti-pinhole property, a closely adhering property to meat, hygienic point of view, an anti-curl property, an anti-creep property in warm water, an anti-delayed recovery property and an anti-peeling off property is to be obtained The appropriate adhesive is the one selected from the group consisting of a modified copolymer obtained by grafting a copolymer of ethylene and a vinyl carboxylate or an acrylic ester with an ethylenically unsaturated carboxylic acid or an acid anhydride thereof and a polymeric material obtained by neutralizing said modified copolymer with a metallic compound or a thermoplastic polyurethane. The necessary biaxially stretching conditions are (1) cooling the coextruded film rapidly to a temperature which is lower than the second order transition temperature of the polyamide (if two different kinds of polyamide are used, the lower secondary transition temperature of the two) and is not lower than 30° C of the transition temperature; (2) making the layer of a copolymer of vinylidene chloride in an amorphous state; (3) making both surface layers of polyamide absorb water 1 to 5% by weight; (4) biaxially stretching the film at a temperature of 60° C to 100° C; and (5) heat treating the stretched film for more than 2 seconds at 70 to 100° C while making the outer surface layer of polyamide absorb water 2 to 7% thereby shrinking the film 1 to 15% both lengthwise and breadthwise.

Based on these findings, the present inventors have attained the present invention.

SUMMARY OF THE INVENTION

The object of the present invention lies in offering a heat-shrinkable laminate film which has overcome the defects of the conventional one and is suitable for packaging foodstuffs.

More in detail, the object of the present invention lies in offering a heat-shrinkable laminate film which is excellent in a barriering property to gaseous oxygen, a barrier property to water vapor, an anti-creep property at a high temperature, an anti-pinhole property, a closely adhering property to meat, hygienic point of view, an anti-curl property, an anti-creep property in a warm water, an anti-delayed shrinking property and an anti-peeling off property.

Further, the object of the present invention lies in offering a heat-shrinkable laminate film having a core layer of a copolymer of vinylidene chloride, two surface layers of a polyamide and a specified adhesive layer between each of the two surface layers and the core layer.

Still more, the object of the present invention lies in offering an industrially advantageous process for producing the heat-shrinkable laminate film which is good for the above objects.

BRIEF EXPLANATION OF THE DRAWING

Of the attached drawing.

DETAILED EXPLANATION OF THE INVENTION

Figure 1:
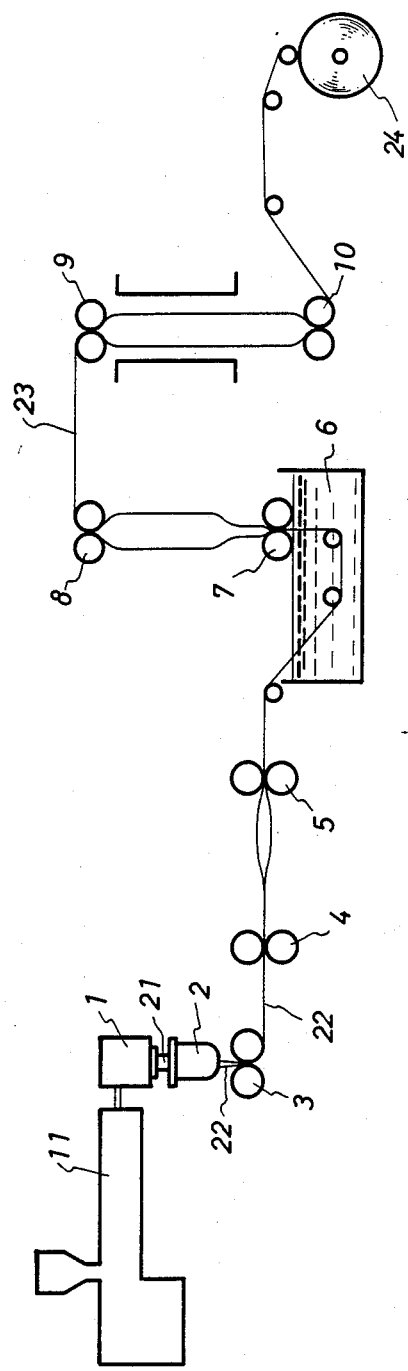
FIG. 1 shows the layout of the process for producing a heat-shrinkable laminate film according to the present invention and 1 is a circular die, 2 is a shower ring, 3, 4, 5, 7, 8, 9 and 10 are pinch rolls, 6 is a water bath, 11 is an extruder, 21, 22 and 23 are films and 24 is a winding roll.

The present invention relates to a heat-shrinkable laminate film comprising a core layer made of a copolymer of vinylidene chloride, two surface layers made of a polyamide and an adhesive layer between each of the two surface layers and the core layer and a process for producing the heat-shrinkable laminate film. The adhesive layer is made of an adhesive selected from the group consisting of a modified copolymer obtained by grafting a copolymer of ethylene and a vinyl carboxylate or an acrylic ester with an ethylenically unsaturated carboxylic acid or an acid anhydride thereof and a polymeric material obtained by neutralizing said modified copolymer with a metallic compound or a thermoplastic polyurethane. The heat-shrinkable laminate film shows a rate of shrinkability of not less than 10% both lengthwise and breadthwise after keeping the film 3 seconds in an atmosphere of 90° C, the rate of delayed recovery of not more than 2% both lengthwise and breadthwise at room temperature and the rate of creep of not more than 20% after immersing the film 10 seconds in a warm water of 80° C with a load of 1 kg/mm².

The copolymer of vinylidene chloride which is used as a material of the core layer according to the present invention is a copolymer mainly composed of vinylidene chloride and preferably, a copolymer composed of 65 to 95% by weight of vinylidene chloride and 35 to 5% by weight of at least one comonomer which is copolymerizable with vinylidene chloride. As the comonomer which is copolymerizable with vinylidene chloride, for instance, a monomer selected from the group consisting of vinyl chloride, acrylonitrile, alkyl esters of acrylic acid (number of carbon atoms of the alkyl group being 1 to 18), alkyl esters of methacrylic acid (number of carbon atoms of the alkyl group being 1 to 18), acrylic acid and methacrylic acid can be mentioned.

When the amount of vinylidene chloride is less than 65% by weight, the copolymer is rubber-like at ordinary temperature and it is impossible to obtain any molded product of a stable form and when the amount of vinylidene chloride is more than 95% by weight, the melting point of the copolymer is too high and the copolymer is apt to be thermally decomposed. Accordingly, it is difficult to carry out a stable melt extrusion.

The copolymer of vinylidene chloride may contain, as an occasion demands, a small amount of plasticizers, stabilizers and other additives. These additives have been publicly known by the persons in the art. As representative plasticizers or stabilizers used in the copolymer of vinylidene chloride, dioctyl sebacate, dibutyl sebacate, acetyltributyl citrate or epoxidized soy bean oil can be mentioned.

The layer of the copolymer of vinylidene chloride of the present invention preferably has a thickness of 3 to 30 $\mu$m. When the thickness is less than 3 $\mu$m, it is difficult to maintain the barrier property of the film against gaseous oxygen and water vapor which is one of the object of the present invention. On the other hand, when the thickness is over 30 $\mu$m, it is difficult to prevent the generation of cracks due to a low temperature fragility and pinholes even when it is protected by biaxially stretched two surface layers made of a polyamide.

As the polyamide Nylon-6, Nylon-7, Nylon-8, Nylon-10, Nylon-11, Nylon-12, Nylon-6-6, Nylon 6-10, Nylon 6-12, Nylon 6-66, mixture thereof and a copolymer of monomers of Nylon listed above can be exemplified. Further, to the polyamide, a polymer of ethylene series such as polyethylene, an ionomer, etc. or a polymer of vinyl alcohol series such as a saponified copolymer of ethylene and vinyl acetate, etc. may be added in an amount not exceeding 50% by weight to an amount of the polyamide.

From the view point of both the processability in coextrusion of melt-piling within the die and the operability in the step of stretching, the melt viscosity of the polyamide, measured with KOKA-type flow tester, is preferably $5 \times 10^3$ to $50 \times 10^3$ poise under a sheering speed of 100 sec$^{-1}$ at the same temperature as an extrusion temperature and particularly, the melt viscosity of $10 \times 10^3$ to $20 \times 10^3$ poise is most preferable.

On the other hand, a large stretching force is necessary in the case of biaxially stretching the laminate film using a polyamide and the laminate film itself must bear the stress during the stretching. Further, it is necessary for the laminate film to withstand against a pressure at the time of filling a foodstuff int the casing and to maintain an anti-creep property against a heat treatment (a few minutes to a few hours at 70 to 95° C). Judging from these requirements, it is preferable to use the film with a thickness of the polyamide layer 5 to 50 $\mu$m, more preferably 10 to 40 $\mu$m. Furthermore, as the polyamide layer has an oil-resistance, is hard to be swollen by fats contained in foodstuffs and adheres closely and firmly to contents such as hams and sausages, it is necessary to provide a polyamide layer to the inner surface layer in the present invention.

Still more, the polyamide of the two surface layers can be same or different each other and in the latter case, an either polyamide can be used for inner surface layer to obtain a good adhesion to contents.

Concerning the adhesive, when a coextruded laminate film is stretched to produce a heat-shrinkable laminate film as in the present invention, it is necessary for the film to have excellent adhesions between the layers in order to withstand a peeling-off power at the time of stretching, and the adhesive should be heat-resistant under the heat-treatment conditions (a few minutes to a few hours, at 70 to 95° C) to prevent the peeling off during the treatment.

In the present invention, the adhesive can fulfill the above necessities by using a modified copolymer obtained by grafting a copolymer of ethylene and a vinyl carboxylate or an acrylic ester with an ethylenically unsaturated carboxylic acid or an acid anhydride thereof and a polymeric material obtained by neutralizing said modified copolymer with a metallic compound or a thermoplastic polyurethane.

As a monomer copolymerizable with ethylene, vinyl acetate or vinyl propionate is used, and as the acrylic ester, ($C_1$–$C_8$) alkyl acrylate is preferably used.

As has been described, the polymer used as the adhesive in the present invention is a polymer obtained by acid-modifying a copolymer of ethylene and a vinyl ester or an acrylic ester with an ethylenically unsaturated carboxylic acid, such as acrylic acid, methacrylic acid, maleic acid, fumaric acid, etc. or its anhydride, such as maleic anhydride, etc. "Acid-modification" herein described means a step of introducing the unsaturated carboxylic acid into the copolymer by a graft polymerization reaction, etc.

Further, as the adhesive of the present invention, a polymer, which is obtained by modifying the acid-modified polymer with a metallic compound, preferably a salt of an alkali metal, an oxide of an alkali metal, a salt of an alkaline earth metal or an oxide of an alkaline earth metal, is used. "Metal-modification" herein described means a step of introducing the metal into the polymer by a neutralization reaction, etc.

The amount of the unsaturated carboxylic acid in the acid-modified copolymer is preferably 0.01 to 10% by weight, and the amount of the metal-modified polymer is preferably 0.02 to 10 mol % to the acid group therein.

As the thermoplastic polyurethane used according to the present invention, the linear polyurethane elastomer which can be processed with an ordinary plastic molding method is used. In general, a polyurethane, which is obtained by bringing a linear compound containing hydroxyl group(s), such as dihydroxy(polyethylene adipate), dihydroxy(polybutylene adipate), dihydroxy(polyhexamethylene adipate), polytetramethylene ether glycol, dihydroxypolycaprolactone and an organic diisocyanate into reaction by a publicly known methods, is preferably used. As a molecular chain-extending agent, 1,4-butylene glycol, paraxylene glycol, bis($\beta$-hydroxyethoxy)benzene, etc. can be used.

As the organic diisocyanate, for instance, diphenylmethana 4,4'-diisocyanate, 1,6-hexamethylene diisocyanate and toluylene diisocyanate are preferably used.

As the thermoplastic polyurethane, those having the registered trade name of PARAPLENE have been known.

The thickness of the adhesive layer is from 1 $\mu$m to less than 5 $\mu$m and preferably 1.5 to 4 $\mu$m. In the case where the thickness is below 1 $\mu$m, the adhesive layer cannot exhibit a suitable adhesion.

As the heat-shrinkable laminate film according to the present invention is a biaxially stretched laminate film, by heating the film after filling the content thereinto, an appropriate shrinking of the film occurs and accordingly, the film closely adheres to the meat product which has been filled into the casing without exhibiting any wrinkled and pleated appearance.

The rate of shrinkability of the heat-shrinkable laminate film according to the present invention, when the film is heated for 3 seconds at 90° C in a relaxed state, is not less than 10% both lengthwise(L) and breadthwise(T) and the rate of delayed recovery thereof at room temperature is not more than 2%, preferably not more than 1% both in L direction and T direction. The rate of creep of the film is not more than 20%, preferably not more than 15% after immersing the film 10 seconds into a warm water of 80° C with a load of 1 kg/mm².

The heat-shrinkable film for packaging the food products, particularly for filling and/or packaging hams, sausages, etc. is preferably extruded in a tubular form and the extruded tubular film is stretched generally by the inflation system.

Since a large stretching force is necessary in stretching the extruded film when a film is a laminate film in which a polyamide is used as in the present invention, it is difficult to obtain a stretched film uniform in thickness with this system.

The process according to the present invention is a process for producing a heat-shrinkable laminate film which is excellent in packaging the food products and extremely small in variation of the thickness thereof as a result of improving the defects of the conventional heat-shrinkable laminate film using a polyamide.

Namely, while using three sets or four sets of extruders, the copolymer of the core layer, the same or different polyamides of the two surface layers and the adhesive of the adhesive layer between each of the two surface layers and the core layer are molten and laminated, and then coextruded in a tubular form.

After rapidly cooling the coextruded tubular film to a temperature of not higher than the lower second order transition temperature of the polyamides and not lower than the lower transition temperature by 30° C, thereby keeping the copolymer of vinylidene chloride in an amorphous state, water or an aqueous suspension of talc, it enclosed in the tubular film and the tubular film is kept for 2 to 10 seconds as it is. Thereafter, the treated tubular film is immersed for 2 to 10 seconds, preferably for 3 to 4 seconds in a warm water of 60 to 100° C, preferably 70 to 90° C, thereby controlling the amount of absorbed water by the polyamides of the two surface layers 1 to 5% by weight, preferably 2 to 3% by weight. Then, the treated tubular film is biaxially stretched by an enclosed air 1.5 to 4 times, preferably 2 to 3.5 times lengthwise and 1.5 to 5 times, preferably 3 to 4 times breadthwise at a temperature of 60 to 100° C applying an inflation system.

In this case, it is necessary that the amount of absorbed water in a polyamide of each of the two surface layers is in the range of 1 to 5% by weight, and when the amount of absorbed water in at least one polyamide layer is less than 1% by weight, the biaxially stretched laminate film becomes remarkably curled and the rate of delayed recovery and also the rate of creep thereof are remarkably large resulting in a poor dimensional stability.

On the other hand, when the amount of absorbed water in at least one of the polyamide layers is over 5% by weight, the effect of orientation becomes poor and it is impossible to obtain the heat-shrinkable laminate film which is the object of the present invention.

In the next place, air is again enclosed within the stretched tubular film and the tubular film is subjected to heat-treatment for not shorter than 2 seconds, preferably not shorter than 5 seconds at a temperature of 70 to 100° C while spraying steam or hot water onto outside of the tubular film in order to make the polyamide of outer surface layer absorb water in an amount of 2 to 7% by weight, preferably 4 to 5% by weight, thereby making the film shrink 1 to 15%, preferably 2 to 10% both lengthwise and breadthwise. Accordingly, the heat-shrinkable laminate film according to the present invention is obtained.

When the shrinkage by the heat-treatment is not given, it is difficult to retain the rate of creep of the product not more than 20% in warm water. Further, when the heat-treatment was conducted in the conditions outside the condition set forth above, it is impossible to obtain the heat-shrinkable laminate film according to the present invention, because the undesirable deformations such as curls, delayed recovery, creep in warm water, etc. become larger.

In the following, an example of the process for producing the heat-shrinkable laminate film according to the present invention will be explained by the attached drawing.

FIG. 1 of the attached drawing shows the whole layout of the process for production of the heat-shrinkable laminate film according to the present invention.

In FIG. 1, the tubular five-layered film (21) extruded by an extruder (11) (although three or four extruders are used, only one extruder is shown) through a circular die (1) is rapidly cooled to a temperature of not higher than the lower second order transition point of the polyamides and of not lower than 30° C than the transition point, by spraying water of a temperature of 10 to 50° C, preferably 20 to 30° C, to the tubular film from the shower ring (2) which is installed just after the lip of the circular die (1) and then is drawn by the pinch rolls (3).

Then, water or an aqueous suspension of talc, is enclosed within the tubular film between a pair of pinch rolls (4 and 5) and the treated tubular film is immersed in a water bath (6), thereby making the polyamides of the two surface layers absorb water. The tubular film which absorbed water is biaxially stretched by the enclosed air between a pair of pinch rolls (7 and 8).

Air is again enclosed in the treated tubular film between the succeeding pair of the pinch rolls (9 and 10), and steam or hot water is sprayed to the tubular film, thereby carrying out the heat-treatment while making the polyamide of the outermost layer absorb water. At this time, it is preferable to make the speed of the pinch rolls of the take-in side (10) slower than the speed of the pinch rolls of the send-off side (9) by 1 to 3%, and it is preferable to adjust the pressure of the enclosed air so that the folded width of the film is reduced 5 to 15% before and after the heat-treatment.

The heat-treated film is wound around the winding roll (24) to obtain the heat-shrinkable laminate film according to the present invention.

The present invention will be explained more in detail while referring to the following non-limitative Examples.

EXAMPLE 1

A copolymer compound (A) and the two polymers (B and C) were respectively and separately extruded by three extruders and the extruded polymer (B and C) were branched into two conduits. The extruded and treated molten polymers were supplied into a circular die to melt-laminate in the order of C/B/A/B/C from the inner layer to the outer layer in a tubular state.

Copolymer compound (A):
100 parts by weight of a copolymer of vinylidene chloride and vinyl chloride (83/17 by weight)
1 part by weight of dibutyl sebacate and 2 parts by weight of epoxidized soy bean oil Polymer (B):

A polymer obtained by grafting maleic anhydride to a copolymer of ethylene and ethyl acrylate (content of ethyl acrylate being 15% by weight) was modified with $MgCO_3$. Melt index of Polymer (B) was 6 g/10 min. The amount of maleic anhydride in the grafted polymer was 0.5% by weight and the amount of Mg in Polymer (B) was 0.4% by weight.

Polymer (C):

A polyamide, Nylon 6-66, made by TORAY Co., Ltd. under the symbol of CM-6041 X., of the melting point of 200° C, the crystallization temperature of 150° C, the second order transition point of 46° C and the melt viscosity is $1.7 \times 10^4$ poise at 220° C. A temperature of the resin of the molten tubular film at the outlet of the circular die was 230° C.

The extruded tubular film was rapidly cooled by spraying water of 20° C from the shower ring (2) to the outside of the molten tubular film and the cooled tubular film was folded by pinch rolls (3) to be a five-layered tubular film of the folded width of 33 mm and of the thickness of 450 μm.

Thereafter, about 200 ml of an aqueous 35% suspension of talc was enclosed in the tubular film between a pair of pinch rolls (4 and 5), and the treated tubular film was heated for 3 seconds in a water bath of 80° C to make the two polyamide layers absorb water.

In the next place, the tubular film was biaxially stretched by an air pressure 3 times lengthwise and 3.4 times breadthwise simultaneously between a pair of pinch rolls (7 and 8).

During the stretching step, the polyamide of both the inner and outer surface layers contains about 2% by weight of water.

After enclosing air in the biaxially stretched film between a pair of pinch rolls (9 and 10), the film was subjected to heat-treatment for 5 seconds by heating with steam from outside of the tube at 98° C. At the point, the rate of water absorption by the polyamide of outer surface layer was 4.5%. Further, the speed of the pinch rolls of take-in side (10) was slower than the speed of the pinch rolls of send-off side (9) by 2%, and the pressure of enclosed air was adjusted so that the folded width of the heat treated tubular film was reduced by 9% before and after the heat-treatment.

After the heat-treatment, the biaxially stretched five-layered film was wound up by an ordinary method.

The obtained biaxially stretched five-layered film showed the folded width of 102 mm and the thicknesses as follows.

From the inner surface layer side, C layer=10 μm, B layer=3.5 μm, A layer=8 μm, B layer=3.5 μm and C layer=20 μm. The total thickness of the film was 45 μm.

On the film obtained in Example 1 and the packaged casing cripped both end, each of the properties of the film was measured by the respective methods shown in Table 1 and the results are shown in Table 2.

TABLE 1

| Item of measurement | Method of measurement |
| --- | --- |
| Rate of shrinkability | On 20 pieces of film cut from the wound film into a dimensions of 10 cm × 10 cm, test is carried out by heating the piece of film for 3 seconds at 90° C. in the relaxed state. The average rates of shrinking of the pieces to the original length in the direction of winding and in the transverse direction are taken as the rates of shrinkability. |
| Inter-layer adhesion | Adhesion of the polyamide layer and the layer of copolymer of vinylidene chloride in ode-paper-like pieces of the composite film of a width of 20 mm is measured by the T(180°)-peeling-off method while using a TENSILION ® tester (a tensile tester, made by TOYO-SEIKI Co.) |
| Barrier property to gaseous oxygen ($P-O_2$) | The property is represented by the permeated amount of gaseous oxygen through the piece of the film at 30° C. and RH of 100%. |
| Barrier property to water vapour (WVTR) | The property is represented by the permeated amount of water vapor through the piece of the film at 40° C. and RH of 95%. |
| Cold-resistance (number of pinholes) | After compressing a film casing of 10 m in length to the length of 1 m while giving wrinkles to the film casing in an atmosphere of 5° C., one end of film casing is tightly sealed and air of 0.3 kg/cm²G is blown into the film casing to restore the original length. Thereafter, the treated film casing is immersed into water at ordinary temperature and the number of pinholes formed on the film casing is measured. |
| Rate of creep | The ode-paper-like piece of the film of a width of 20 mm is immersed into a warm water at 80° C. for 10 seconds while hanging a load corresponding to 1 kg/mm² from the piece. After rapidly cooling the piece of the film, the load is removed and the rate of elongation of the piece to its original length is represented by the rate of creep (%). |
| Rate of delayed recovery | The film which was wound in a roll-form is unwound about 1 m, and the length and the width of the unwound piece of the film are accurately measured. After hanging the piece of the film for a week in a room at 25° C. and RH of 65% with one end of the piece fixed, the treated piece is taken out from the room and the length and the width thereof are accurately measured. The rate of change of the dimension of the piece of the film is represented by the rate of delayed recovery. |
| Degree of curl | One end of the tubular film was cut off by a cutter, and after leaving the cut off piece by itself in a room at 25° C. and RH of 65% for one hour, the piece is taken out from the room and the number of complete curls of the piece is measured with the naked eye. The result is represented by angle(°). |
| Degree of close adhesion of film to meat | Symbol     State of adhesion<br>0     remarkable secretion of liquid between film and meat<br>1     no adhesion to meat (meat juice on the film surface)<br>2     no adhesion to meat (no meat juice on the film surface)<br>3     10% of the area of the film adhered to meat<br>4     25% of the area of the film adhered to meat<br>5     50% of the area of the film adhered to meat<br>6     75% of the area of the film adhered to meat<br>7     almost all the area of the film adhered to meat<br>8     the whole surface area of the film adhered to meat |

TABLE 1-continued

| Item of measurement | Method of measurement |
|---|---|
| | and a large amount of meat remained on the film when the film was peeled off |
| Appearance of the packaged product | After filling about 6 kg of a sausage meat into the film casing of the folded width of 230 mm by an ordinary method, the packaged product is subjected to heat-treatment for 2 hours at 80° C. in a hanged state. Thereafter, the packaged product is preserved for one day in a refrigerator at 5° C. and the extent of the wrinkles on the outer surface of the film casing and the extent of the change of the outer diameter of the film casing are observed and judged. |

| Symbol | Appearance |
|---|---|
| G | no wrinkles and no change of the outer diameter on top, middle and bottom of the sausage. |
| H | wrinkles are observed partly in the shoulder part and the change of the outer diameter on top, middle and bottom of the sausage is observed. |
| B | remarkable generation of wrinkles and change of outer diameter on top, middle and bottom of the sausage. |

EXAMPLE 2

In the same manner as in Example 1 except for changing the adhesive of the second and fourth layers into a thermoplastic polyurethane (D), a biaxially stretched five-layered film was produced. The properties of the obtained film were measured by the same methods as in Example 1 and the results are shown in Table 2.

Polymer (D):
Thermoplastic polyurethane erastomer (of a series of adipate polyester), made by NIPPON ELASTORAN Co., Ltd. under the trade name of PARAPREN ® P22S
Softening point: 105° C
Density: 1.21 g/cm$^3$

EXAMPLE 3

In the same manner as in Example 1 except for changing Nylon 6-66 as the polyamide of the first layer in Example 1 to the following Nylon 6-12 (E) and using four extruders instead of three, a biaxially stretched five-layered film was produced. The properties of the obtained film were measured by the same methods as in Example 1, and the results are shown also in Table 2.

Polymer (E):
Nylon 6-12, made by Emus Co., Ltd. under the symbol of CAE6
Melting point: 125.7° C
Second order transition point: 27° C
Melt viscosity: $2.0 \times 10^{14}$ poise (160° C)

COMPARATIVE EXAMPLE 1

In the same manner as in Example 1 except for changing the polymer of the fifth layer to the following polymer (F), not enclosing the aqueous suspension of talc between the pair of pinch rolls (4 and 5), biaxially stretching the film in a water bath of 75° C and winding up the stretched film without carrying out the heat-treatment, a biaxially stretched five-layered film was produced. The properties of the obtained film were measured by the same methods as in Example 1, and the results are also shown in Table 2.

Polymer (F):
Low density polyethylene
Melt index: 1.22 g/10 min.
Density: 0.92 g/cm$^3$ In this case, the curl of the cut end of the film was remarkable, and the change of dimensions of the film occurred before filling meat into the film. Such a change of dimensions of the film became the cause of dimensional irregularity of the crip-packaged products.

Furthermore, wrinkles and changes of the external form occurred on the film.

Each of the laminate films according to the present invention obtained in Example 1 to 3 was clearly superior to the film obtained in Comparative Example 1.

COMPARATIVE EXAMPLES 2 AND 3

As Comparative Examples, the properties of the commerciallized and representative mono-layered film casing are also shown in Table 2.

TABLE 2

| | | Example 1 | Example 2 | Example 3 | Comparative Example 1 | Comparative Example 2 | Comparative Example 3 |
|---|---|---|---|---|---|---|---|
| Construction of each layer (thickness in micrometers) | First layer | C (10) | C (10) | E (10) | C (20) | Single layer of Polymer (40) | Single layer of Nylon 6 (55) |
| | Second layer | B (3.5) | D (3.5) | B (3.5) | B (3.5) | | |
| | Third layer | A (8) | A (8) | A (8) | A (8) | | |
| | Fourth layer | B (3.5) | D (3.5) | B (3.5) | B (3.5) | | |
| | Fifth layer | C (20) | C (20) | C (20) | F (10) | | |
| Temperature of water bath (°C.) | | 80 | 80 | 80 | 75 | | |
| Stretchability | | Good | Good | Good | Good | — | — |
| Inter-layer adhesion (g/20 mm) | | 850 | 800 | 850 | 800 | — | — |
| Rate of shrinkability (%) L/T | | 15/12 | 16/11 | 17/15 | 23/20 | 20/15 | 13/10 |
| Barrier property to gaseous oxygen | | 40 | 40 | 40 | 50 | 35 | 70 |

TABLE 2-continued

|  | Example | | | Comparative Example | | |
| --- | --- | --- | --- | --- | --- | --- |
|  | 1 | 2 | 3 | 1 | 2 | 3 |
| (cc/m² · day · atm) | | | | | | |
| Barrier property to water vapor (g/m² · day) | 8 | 8 | 8 | 6 | 8 | 50 |
| Cold-resistance, number of pinholes | 0 | 0 | 0 | 0 | 4 | 0 |
| Rate of creep (%), L/T | 12/9 | 12/9 | 13/10 | 25/18 | 28/20 | 7/5 |
| Rate of delayed recovery (%), L/T | 0.5/0.5 | 1.0/1.0 | 0.5/0.5 | 7.0/7.0 | 4.0/4.0 | 0.5/0.5 |
| Degree of curl (°) | 10 | 10 | 10 | 360 | 10 | 0 |
| Degree of close adhesion of film to meat | 7 | 7 | 7 | 7 | 4 | 7 |
| Appearance of the packaged product | G | G | G | F | F | F |
| Remarks | | | | Remarkable wrinkles at shoulder part | | Remarkable weight loss of the content |

As are seen in the above results including those shown in Table 2, the superiority of the film according to the present invention as a film for packaging foodstuffs is definite.

What is claimed is:

1. A heat-shrinkable laminate film consisting of a core layer of a copolymer of vinylidene chloride, two surface layers of a polyamide and a modified copolymer obtained by grafting a copolymer of ethylene and a vinyl carboxylate or an acrylic ester with an ethylenically unsaturated carboxylic acid or an acid anhydride thereof, a polymeric material obtained by neutralizing said modified copolymer with a metallic compound and a thermoplastic polyurethane as an adhesive layer between each one of said two surface layers and said core layer, and showing the rate of shrinkage of not less than 10% both lengthwise and breadthwise after keeping said film 3 seconds in an atmosphere of 90° C, the rate of delayed recovery of not more than 2% in room temperature and the rate of creep of not more than 20% after immersing said film 10 seconds into a warm water of 80° C with a load of 1 kg/mm², produced by coextruding the copolymer of vinylidene chloride, the polyamide and the adhesive to form a coextruded laminate film and rapidly cooling the thus coextruded laminate film to a temperature of lower than the second order transition point of one of the polyamides, which is lower, but not lower than 30° C below the lower transition point, thereby making said copolymer of vinylidene chloride into an amorphous state and making said polyamide of said two surface layers absorb water so that the rate of absorption of water is from 1 to 5% by weight, biaxially stretching the thus rapidly cooled film at a temperature of from 60 to 100° C, and thereafter, subjecting the thus biaxially stretched film to heat-treatment for not shorter than 2 seconds at a temperature of from 70 to 100° C while making said polymide of the outer surface layer absorb water from 2 to 7% by weight, thereby making said biaxially stretched film shrink from 1 to 15% both lengthwise and breadthwise.

2. A heat-shrinkable laminate film according to claim 1, wherein said polyamide contains a polymer of ethylene series or a polymer of vinyl alcohol series to the extent not exceeding 50% by weight.

3. A heat-shrinkable laminate film according to claim 1, wherein the thickness of said core layer is 3 to 30 μm, the thickness of each of said two surface layers is 5 to 50 μm and the thickness of said adhesive layer is not less than 1 μm and less than 5 μm.

4. A heat-shrinkable laminate film according to claim 1, wherein said adhesive layer comprises a copolymer obtained by grafting copolymer of ethylene and a vinyl ester or an acrylic ester with an ethylenically unsaturated carboxylic acid or the anhydride thereof.

5. A heat-shrinkable laminate film according to claim 1, wherein said adhesive layer comprises a copolymer obtained by neutralizing said acid-modified polymer with a metallic compound.

6. A heat-shrinkable laminate film according to claim 1, wherein said adhesive layer comprises a thermoplastic polyurethane.

7. A heat-shrinkable laminate film according to claim 1, wherein the same polyamide is used in the outer and inner surface layers of said film.

8. A heat-shrinkable laminate film according to claim 1, wherein the polyamide used in the outer surface layer of said film and the polyamide used in the inner surface layer of said film are different from each other.

* * * * *